United States Patent
Musio et al.

(10) Patent No.: US 10,982,018 B2
(45) Date of Patent: Apr. 20, 2021

(54) METHOD OF MAKING FLUOROPOLYMER DISPERSION

(71) Applicant: SOLVAY SPECIALTY POLYMERS ITALY S.P.A., Bollate (IT)

(72) Inventors: Stefana Musio, Alessandria (IT);
Marco Malvasi, Novi Ligure (IT);
Valeriy Kapelyushko, Alessandria (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 15/515,483

(22) PCT Filed: Sep. 29, 2015

(86) PCT No.: PCT/EP2015/072441
§ 371 (c)(1),
(2) Date: Mar. 29, 2017

(87) PCT Pub. No.: WO2016/050776
PCT Pub. Date: Apr. 7, 2016

(65) Prior Publication Data
US 2018/0230245 A1 Aug. 16, 2018

(30) Foreign Application Priority Data
Sep. 30, 2014 (EP) .................................... 14187156

(51) Int. Cl.
| | | |
|---|---|---|
| *C08L 27/18* | (2006.01) | |
| *C08F 2/26* | (2006.01) | |
| *C08F 14/26* | (2006.01) | |
| *C08K 5/095* | (2006.01) | |
| *C08L 71/02* | (2006.01) | |
| *C09D 127/18* | (2006.01) | |

(52) U.S. Cl.
CPC .............. *C08F 2/26* (2013.01); *C08F 14/26* (2013.01); *C08K 5/095* (2013.01); *C08L 27/18* (2013.01); *C08L 71/02* (2013.01); *C09D 127/18* (2013.01)

(58) Field of Classification Search
CPC ....... C08K 5/095; C08L 27/18; C09D 127/18; C08F 14/26
See application file for complete search history.

(56) References Cited

U.S. PATENT DOCUMENTS

| | | | |
|---|---|---|---|
| 4,369,266 A | 1/1983 | Kuhls et al. | |
| 5,285,002 A | 2/1994 | Grootaert | |
| 6,395,848 B1 * | 5/2002 | Morgan ................. | C08F 14/26 523/203 |
| 6,878,772 B2 * | 4/2005 | Visca ..................... | C03C 25/40 524/757 |
| 9,580,590 B2 * | 2/2017 | Taira ..................... | C08F 114/26 |
| 2003/0125421 A1 | 7/2003 | Bladel et al. | |
| 2005/0158528 A1 | 7/2005 | Sasaki et al. | |
| 2014/0200310 A1 * | 7/2014 | Taira ..................... | C08F 114/26 524/758 |
| 2018/0230245 A1 * | 8/2018 | Musio ................... | C09D 127/18 |

FOREIGN PATENT DOCUMENTS

| | | |
|---|---|---|
| EP | 1334996 A2 | 8/2003 |
| EP | 1676867 A1 | 7/2006 |
| EP | 1676868 A1 | 7/2006 |
| WO | 0035971 A1 | 6/2000 |
| WO | 2013027850 A1 | 2/2013 |

OTHER PUBLICATIONS

Kasai et al. Journal of Applied Polymer Science, vol. 57, 797-809 (1995).*

* cited by examiner

*Primary Examiner* — Michael A Salvitti
(74) *Attorney, Agent, or Firm* — Osha Bergman Watanabe & Burton LLP

(57) ABSTRACT

The invention pertains to a method for making a fluoropolymer dispersion, said method comprising an aqueous emulsion polymerization of one or more fluorinated monomers wherein said aqueous emulsion polymerization is carried out in an aqueous medium comprising a surfactant mixture [mixture (S)] comprising: at least one perfluorohexanoic acid or salt thereof [surfactant (C6)], in an amount of 1 to 5 g/l, with respect to said aqueous medium; and at least one linear bifunctional perfluoropolyether surfactant [surfactant (PFPE)] complying with formula (I) here below: XpOOC—$CF_2$-O-$(CF_2O)_{n'}(CF_2CF_2O)_{m'}$-$CF_2$—COOXp (I) wherein: Xp, equal to or different from each other, is a hydrogen atom, a monovalent metal, preferably an alkaline metal, or an ammonium group of formula —$N(R'_n)_4$, wherein $R'_n$, equal or different at each occurrence, is a hydrogen atom or a $C_1$-$C_6$ hydrocarbon group, preferably an alkyl group; n' and m' are independently integers >0 such that the number average molecular weight of the surfactant (PFPE) is of 500 to 2500, said surfactant (PFPE) being used in an amount of 0.005 to 0.5 g/l, with respect to said aqueous medium.

12 Claims, No Drawings

METHOD OF MAKING FLUOROPOLYMER DISPERSION

CROSS-REFERENCE TO RELATED APPLICATION

This application is a U.S. national stage entry under 35 U.S.C. §371 of International Application No. PCT/EP2015/072441 filed Sep. 29, 2015, which claims priority to European application No. 14187156.6 filed on Sep. 30, 2014. The entire contents of these applications are explicitly incorporated herein by this reference.

TECHNICAL FIELD

The present invention pertains to a method of making a fluoropolymer dispersion, and to fluoropolymer dispersion therefrom.

BACKGROUND ART

Fluoropolymers, i.e. polymers having a fluorinated backbone, have been long known and have been used in a variety of applications because of several desirable properties such as heat resistance, chemical resistance, weatherability, UV-stability etc.

A frequently used method for producing fluoropolymers involves aqueous emulsion polymerization of one or more fluorinated monomers generally involving the use of fluorinated surfactants. Frequently used fluorinated surfactants include perfluorooctanoic acids and salts thereof, in particular ammonium perfluorooctanoic acid.

Recently, perfluoroalkanoic acids having 8 or more carbon atoms have raised environmental concerns. For instance, perfluoroalkanoic acids have been found to show bioaccumulation. Accordingly, efforts are now devoted to phasing out from such compounds and methods have been developed to manufacture fluoropolymer products using alternative surfactants having a more favourable toxicological profile.

Several approaches have been recently pursued to this aim, typically involving fluorosurfactants comprising a perfluoroalkyl chain interrupted by one or more catenary oxygen atoms, said chain having an ionic carboxylate group at one of its ends, or based on the use of different dispersants, thus dissociating the nucleating and stabilizing effect through the use of low molecular weight and high molecular weight fluorosurfactant, both generally understood to possess a more environmental friendly profile than C8 perfluoroalkanoic acids.

Attempts have been hence focused on developing solutions based notably on shorter chain perfluoroalkanoic acids, inherently possessing lower bioaccumulation potential.

Nevertheless, shorter chain perfluoroalkanoic acid surfactants, like perfluorohexanoate acid surfactants, although possibly possessing adequate nucleating capabilities, often fail to possess suitable stabilizing effects so as to sustain high yield dispersion polymerization of fluoropolymers, in particular of TFE polymers.

Mixtures of surfactants have been hence been proposed to this aim.

Thus, U.S. Pat. No. 6,395,848 (E.I. DUPONT DE NEMOURS & CIE) 28 May 2002 discloses a method for the aqueous dispersion polymerization of fluoromonomers in the presence of a combination of fluorosurfactants, one of which is a perfluoropolyether carboxylic acid or sulfonic acid or salt thereof, and the other one is notably a fluoroalkyl carboxylic acid or salt thereof, preferably perfluoroalkyl carboxylic acids and salts, having 6-20 carbon atoms, preferably 6-12 carbon atoms.

The expression "perfluoropolyether carboxylic acid or salt thereof" is used in said document to encompass any perfluoropolyether chain structure in which oxygen atoms in the backbone of the molecule are separated by saturated fluorocarbon groups having 1-3 carbon atoms and which possesses carboxylic ends. Among these compounds, perfluoropolyethers with carboxylic ends (i.e. bifunctional compounds) are disclosed.

Within this frame, WO 2013/027850 (DAIKIN INDUSTRIES) 28 Feb. 2013 discloses a method for manufacturing an aqueous polytetrafluoroethylene dispersion, said method including a step of polymerizing tetrafluoroethylene in an aqueous medium in the presence of perfluorohexanoic acid or a salt thereof.

The method disclosed therein possibly include the simultaneous use of a fluoropolyether acid or salt, having a molecular weight of 800 to 3500, preferably of 1000 to 2500, possibly having at one or both end acid group(s), said acid group(s) being possibly carboxylic acid group(s) phosphonic acid group(s) or sulfonic acid group(s).

More particularly, Ex. 3 and Ex. 5 thereof are exemplary embodiments of polymerization methods wherein tetrafluoroethylene is polymerized in the presence of a mixture of ammonium hexafluorohexanoate and of a monofunctional perfluoropolyether with branched chain of formula —(CF(CF$_3$)CF$_2$O)— of trade name KRTYOX® 157 FSL.

Now, the Applicant has found that while the combination of ammonium hexafluorohexanoate and said perfluoropolyether, as disclosed in WO 2013/027850, is effective in achieving a certain conversion of tetrafluoroethylene, when targeting higher conversions, this system is ineffective in ensuring acceptable reaction rates, and high polymer build-up and fouling of reactor, as well as significant formation of coagulum were observed, especially when using ammonium hexafluorohexanoate in lower concentrations.

The need was hence felt for an improved process for the aqueous polymerization of fluoromonomers based on the use of perfluorohexanoate surfactant, but enabling achieving more advantageous conversions with no reactor fouling or coagulum, hence providing for improved latex stability in polymerization conditions, also at reduced concentration of said perfluorohexanoate surfactant.

DISCLOSURE OF INVENTION

Thus, in one aspect, the invention relates to a method for making a fluoropolymer dispersion, said method comprising an aqueous emulsion polymerization of one or more fluorinated monomers wherein said aqueous emulsion polymerization is carried out in an aqueous medium comprising a surfactant mixture [mixture (S)] comprising:

at least one perfluorohexanoate acid or salt [surfactant (C6)], in an amount of 1 to 5 g/l, with respect to said aqueous medium; and at least one one linear bifunctional perfluoropolyether surfactant [surfactant (PFPE)] complying with formula (I) here below:

$$X_pOOC-CF_2-O-(CF_2O)_n(CF_2CF_2O)_m-CF_2-COOX_p \quad (I)$$

wherein:

$X_p$, equal to or different from each other, is a hydrogen atom, a monovalent metal, preferably an alkaline metal, or an ammonium group of formula —N(R'$_n$)$_4$, wherein R'$_n$, equal or different at each occurrence, is a hydrogen atom or a $C_1$-$C_6$ hydrocarbon group, preferably an alkyl group;

n' and m' are independently integers >0 such that the number average molecular weight of the surfactant (PFPE) is of 500 to 2500, said surfactant (PFPE) being used in an amount of 0.005 to 0.5 g/l, with respect to said aqueous medium.

The Applicant has found that when combining the surfactant (C6) with the surfactant (PFPE) having linear structure and possessing carboxylic groups at both ends, increased polymerization rates can be achieved, while maintaining good stability of the latex, with substantially no build-up and limited coagulum formation during polymerization.

The mixture (S) advantageously comprises at least one perfluorohexanoic acid salt selected from the group consisting of sodium salt, potassium salt, ammonium salt. Preferably, the perfluorohexanoic acid surfactant salt is the ammonium salt.

The amount of surfactant (C6) is generally of at least 1.5 g/l, preferably at least 2 g/l, more preferably at least 2.5 g/l and/or of at most 5 g/l, preferably at most 4.8 g/l, more preferably at least 4.5 g/l, with respect to the aqueous medium.

The surfactant (PFPE) preferably complies with formula (II) here below:

$$X_aOOC\text{---}CF_2\text{---}O\text{---}(CF_2O)_{a'}(CF_2CF_2O)_{a''}\text{---}CF_2\text{---}COOX_a \quad (II)$$

wherein:

$X_a$, equal to or different from each other, is a hydrogen atom or a $NH_4$ group;

a' and a" are integers such that the ratio a"/a' is comprised between 0.3 and 10, and that the number average molecular weight is of 500 to 2000, preferably of 600 to 1800.

The amount of surfactant (PFPE) is generally of at least 0.01 g/l, preferably at least 0.02 g/l and/or of at most 0.25 g/l, preferably at most 0.1 g/l, with respect to the aqueous medium.

Best results have been obtained when using a mixture (S) consisting of from 3 g/l to 4.5 g/l of surfactant (C6) and from 0.02 to 0.06 g/l of surfactant (PFPE), as above detailed, with respect to the aqueous medium.

In the process of the invention, one or more fluorinated monomers, in particular gaseous fluorinated monomers are emulsion polymerized in said aqueous medium.

By gaseous fluorinated monomers is meant monomers that are present as a gas under the polymerization conditions.

Nevertheless, it may be desirable to add certain monomer to the polymerization in the form of an aqueous emulsion. For example, fluorinated monomers and in particular perfluorinated co-monomers that are liquid under the polymerization conditions may be advantageously added in the form of an aqueous emulsion. Such emulsion of such co-monomers is preferably prepared using mixture (S) as an emulsifier.

In a particular embodiment, the polymerization of the fluorinated monomers is started in the presence of the mixture (S), as above detailed. Additional amounts of fluorinated monomers are generally added during polymerization.

The aqueous emulsion polymerization may be carried out at a temperature between 10 to 150° C., preferably 20° C. to 130° C. and the pressure is typically between 2 and 50 bar, in particular 5 to 35 bar.

The reaction temperature may be varied during the polymerization e.g. for influencing the molecular weight distribution, i.e., to obtain a broad molecular weight distribution or to obtain a bimodal or multimodal molecular weight distribution.

The pH of the polymerization media may be in the range of pH 2-11, preferably 3-10, most preferably 4-10.

The aqueous emulsion polymerization is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinyl peroxide, dipropionylperoxide, dibutyrylperoxide, dibenzoylperoxide, di-ter-butyl-peroxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic initiators include for example ammonium-alkali- or earth alkali salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalite) or fluoroalkyl sulfinates as disclosed in U.S. Pat. No. 5,285,002. The reducing agent typically reduces the half-life time of the persulfate initiator. Additionally, a metal salt catalyst such as for example copper, iron or silver salts may be added. The amount of initiator may be between 0.01% by weight (based on the fluoropolymer solids to be produced) and 1% by weight. In one embodiment, the amount of initiator is between 0.05 and 0.5% by weight. In another embodiment, the amount may be between 0.05 and 0.3% by weight.

The aqueous emulsion polymerization can be carried out in the presence of other materials, such as notably buffers and, if desired, complex-formers or chain-transfer agents.

Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$ and hydrofluorocarbon compounds such as $CH_2F\text{---}CF_3$ (R134a). Additionally esters like ethylacetate, malonic esters can be effective as chain transfer agent in the process of the invention.

Examples of fluorinated monomers that may be polymerized in the process of the invention include partially or fully fluorinated gaseous monomers including fluorinated olefins such as tetrafluoroethylene (TFE), chlorotrifluoroethylene (CTFE), hexafluoropropylene (HFP), vinyl fluoride (VF), vinylidene fluoride (VDF), partially or fully fluorinated allyl ethers and partially or fully fluorinated alkyl or alkoxy-vinyl ethers.

The polymerization may further involve non-fluorinated monomers such as ethylene and propylene.

Further examples of fluorinated monomer that may be used in the aqueous emulsion polymerization according to the invention include those corresponding to the formula: $CF_2\text{=}CF\text{---}O\text{---}R_f$ wherein $R_f$ represents a perfluorinated aliphatic group that may contain one or more oxygen atoms.

Still further, the polymerization may involve comonomers that have a functional group such as for example a group capable of participating in a peroxide cure reaction. Such functional groups include halogens such as Br or I as well as nitrile groups.

The aqueous emulsion polymerization may be used to produce a variety of fluoropolymers including perfluoropolymers, which have a fully fluorinated backbone, as well as partially fluorinated fluoropolymers. Also the aqueous emulsion polymerization may result in melt-processable fluoropolymers as well as those that are not melt-processable such as for example polytetrafluoroethylene and so-called modified polytetrafluoroethylene. The polymerization process can further yield fluoropolymers that can be cured to make fluoroelastomers as well as fluorothermoplasts.

Fluorothermoplasts are generally fluoropolymers that have a distinct and well noticeable melting point, typically in the range of 60 to 320° C. or between 100 and 320° C. They thus have a substantial crystalline phase. Fluoropolymers that are used for making fluoroelastomers typically are amorphous and/or have a negligible amount of crystallinity such that no or hardly any melting point is discernable for these fluoropolymers.

The method of the present invention is particularly adapted for the manufacture of not melt-processable fluoropolymers, and more particularly for the manufacture of polytetrafluoroethylene and so-called modified polytetrafluoroethylene.

According to this embodiment the method of the invention comprises the aqueous emulsion polymerization of tetrafluoroethylene, possibly in combination with one or more perfluoromonomers selected from the group consisting of perfluoroolefins having 3 to 8 carbon atoms and perfluoroalkyl(oxy)vinylethers.

The aqueous emulsion polymerization process of the invention results in a dispersion of the fluoropolymer in water comprising the surfactants mixture (S). Generally the amount of solids of the fluoropolymer in the dispersion directly resulting from the polymerization will vary between 3% by weight and about 40% by weight depending on the polymerization conditions. A typical range is between 5 and 30% by weight, for example between 10 and 25% by weight.

The particle size (volume average diameter) of the fluoropolymer is typically between 40 nm and 400 nm with a typical particle size between 60 nm and about 350 nm being preferred.

The fluoropolymer may be isolated from the dispersion by coagulation if a polymer in solid form is desired. Also, depending on the requirements of the application in which the fluoropolymer is to be used, the fluoropolymer may be post-fluorinated so as to convert any thermally unstable end groups into stable $CF_3$— end groups.

For coating applications, an aqueous dispersion of the fluoropolymer is desired and hence the fluoropolymer will not need to be separated or coagulated from the dispersion. To obtain a fluoropolymer dispersion suitable for use in coating applications such as for example in the impregnation of fabrics or in the coating of metal substrates to make for example cookware, it will generally be desired to add further stabilizing surfactants and/or to further increase the fluoropolymer solids. For example, non-ionic stabilizing surfactants may be added to the fluoropolymer dispersion. Typically these will be added thereto in an amount of 1 to 12% by weight based on fluoropolymer solids. Examples of non-ionic surfactants that may be added include $R^1$—O—$[CH_2CH_2O]_n$—$[R^2O]_m$—$R^3$ (NS) wherein $R^1$ represents an aromatic or aliphatic hydrocarbon group having from 6 to 18 carbon atoms, $R^2$ represents an alkylene having 3 carbon atoms, $R^3$ represents hydrogen or a $C_{1-3}$ alkyl group, n has a value of 0 to 40, m has a value of 0 to 40 and the sum of n+m being at least 2. It will be understood that in the above formula (NS), the units indexed by n and m may appear as blocks or they may be present in an alternating or random configuration. Examples of non-ionic surfactants according to formula (VI) above include alkylphenol oxy ethylates such as ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8. Still further examples include those in which $R^1$ in the above formula (NS) represents an alkyl group of 4 to 20 carbon atoms, m is 0 and $R^3$ is hydrogen. An example thereof includes isotridecanol ethoxylated with about 8 ethoxy groups and which is commercially available as GENAPOL® X080 from Clariant GmbH. Non-ionic surfactants according to formula (NS) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

The amount of fluoropolymer solids in the dispersion may be upconcentrated as needed or desired to an amount between 30 and 70% by weight. Any of the known upconcentration techniques may be used including ultrafiltration and thermal upconcentration.

Still an object of the invention are fluoropolymer dispersions comprising the surfactants mixture (S), as above described.

Said fluoropolymer dispersions are typically obtained by the process of the invention.

Preferred dispersions are those wherein the fluoropolymer is selected from the group consisting of tetrafluoroethylene homopolymers and tetrafluoroethylene copolymers comprising recurring units derived from at least one fluorinated comonomer, typically selected from hexafluoropropylene and perfluoroalkyl(oxy)vinylethers, e.g. perfluoropropylvinylether, perfluoromethylvinylether, or perfluoroethylvinylether.

Concentration of surfactants of the mixture (S) in the fluoropolymer dispersions of the invention can be reduced, if necessary, following traditional techniques. Mention can be made of ultrafiltration combined with percolate recycle, as described in U.S. Pat. No. 4,369,266 (HOECHST AG) 18 Jan. 1983, treatment with ion exchange resins in the presence of a non-ionic surfactant (as described in EP 1155055 A (DYNEON GMBH) 21 Nov. 2001), of an anionic surfactant (as exemplified in EP 1676868 A (SOLVAY SOLEXIS SPA) 5 Jul. 2006) or of a polyelectrolyte (as taught in EP 1676867 A (SOLVAY SOLEXIS SPA) 5 Jul. 2006).

Should the disclosure of any patents, patent applications, and publications which are incorporated herein by reference conflict with the description of the present application to the extent that it may render a term unclear, the present description shall take precedence.

The invention will now be described in more detail with reference to the following examples, whose purpose is merely illustrative and not intended to limit the scope of the invention.

EXAMPLES

Raw materials:

Perfluorohexanoic acid ammonium salt, commercially available as BAOFLON 6A from Shanghai Shenglei (C6 surfactant, herein below) was used as received.

Krytox® 157 FSL commercially available from DuPont™ is a monofunctional branched PFPE based on a chain comprising recurring units derived from hexfluoropropylene oxide combined with one carboxylic acid end group (Krytox®, herein below).

A difunctional linear PFPE of formula HOOC—$CF_2$—O—$(CF_2O)_n$—$(CF_2CF_2O)_m$—$CF_2$—COOH, having averaged molecular weight of 1600 (Z-DIAC, herein after) was used.

Example 1C

C6 Surfactant Alone

A polymerization reactor with a total volume of 90 l equipped with an impeller agitator was charged with 52 l deionized water. The oxygen free reactor was heated up to 69° C. and the agitation system was set to 48 rpm. The reactor was charged with 1 kg of paraffin wax, a water solution containing 235 g of C6 surfactant and with TFE to a pressure of 20 barg. The polymerization was initiated by 130 mg of ammonium peroxodisulfate $(NH_4)_2S_2O_8$ (APS) and 2600 mg of disuccinic acid peroxide (DSAP) in water solutions. As the reaction started, the reaction pressure of 20 barg was maintained by the feeding of TFE into the gas phase. The reaction temperature was increased until 85° C. with a rate of 0.25° C./min. After the feeding of 12 kg of TFE the monomer inlet valves were closed and the stirring stopped. The reactor was depressurized, vented and cooled. The so obtained polymer dispersion was instable and high amount of coagulum was detected, totalling about 49% of converted TFE. The measured polymer in latex was found to be 9.4% w/w whereas the theoretical polymer in latex should have been 18% w/w. The latex particle diameter was 280 nm according to the Laser Light Scattering (LLS) and using DSC analysis the heat of second fusion was 27.3 J/g.

Examples 2C and 3C

Same polymerization procedure as above detailed for Example 1 was repeated, except that varying the amount of TFE fed and converted, and the reaction times. Details are summarized in Table 1.

Examples 4 to 6

C6 Surfactant+ZDiac

Polymerization procedure similar to Example 1 was repeated but using instead of the water solution containing C6 surfactant alone, a water solution including both C6 surfactant and ZDiac, in concentrations and with the amounts of TFE and reaction times as described in Table 1.

Examples 7C to 9C

C6 Surfactant+Krytox®

Polymerization procedure similar to Example 1 was repeated but using instead of the water solution containing C6 surfactant alone, a water solution including both C6 surfactant and Krytox®, in concentrations and with the amounts of TFE and reaction times as described in Table 1.

TABLE 1

| Run | C6 (g) | C6 (g/l) | Z-DIAC (g) | Z-DIAC (g/l) | Krytox (g) | Krytox (g/l) | TFE (kg) | Reaction time (min) |
|---|---|---|---|---|---|---|---|---|
| 1C | — | 4.50 | — | — | — | — | 12 | 90 |
| 2C | — | 4.50 | — | — | — | — | 11 | 120 |
| 3C | — | 4.50 | — | — | — | — | 15 | 90 |
| 4 | 231.4 | 4.45 | 2.6 | 0.05 | — | — | 22.7 | 70 |
| 5 | 179.4 | 3.45 | 2.6 | 0.05 | — | — | 19 | 85 |
| 6 | 226.2 | 4.35 | 1.3 | 0.025 | — | — | 20 | 79 |
| 7C | 231.4 | 4.45 | — | — | 2.6 | 0.05 | 22.5 | 85 |
| 8C | 179.4 | 3.45 | — | — | 2.6 | 0.05 | 19 | 100 |
| 9C | 226.2 | 4.35 | — | — | 1.3 | 0.025 | 20 | 105 |

TABLE 2

| Run | P* (kg/min) | Polymer content in latex (% wt) measured | Polymer content in latex (% wt) theoretical | Coagulum (% wt) | APS (nm) | ΔH $2^{nd}$ fusion (J/g) |
|---|---|---|---|---|---|---|
| 1C | 0.13 | 9 | 18 | 49 | 280 | 27.3 |
| 2C | 0.09 | 9 | 17 | 48 | n.d. | n.d. |
| 3C | 0.17 | 10 | 22 | 56 | 296 | 26.3 |
| 4 | 0.32 | 30 | 30 | 0 | 187 | 33.9 |
| 5 | 0.22 | 20 | 27 | 25 | 183 | 29.9 |
| 6 | 0.25 | 22 | 28 | 22 | 213 | 29.0 |
| 7C | 0.26 | 30 | 30 | 0 | 192 | 33.2 |
| 8C | 0.19 | 4 | 27 | 86 | 330 | 34.4 |
| 9C | 0.19 | 16 | 28 | 41 | 199 | 30.0 |

P*: average polymerization rate expressed as ratio among the converted TFE and overall reaction time.

Data provided in above table well demonstrate that perfluorohexanoate surfactant alone is unable to effectively stabilize fluoropolymers during polymerization, hence leading to a substantial amount of coagulum and very poor solids content in latex.

The addition of a linear difunctional PFPE compound is such to enable maximizing polymerization rate while avoiding coagulation and/or build-up on reactor walls at higher concentration of surfactant (C6). When decreasing the amount of surfactant (C6), the combination with linear difunctional PFPE is more effective in minimizing coagulum formation and achieving a stable dispersion.

The invention claimed is:

1. A method for making a fluoropolymer dispersion, said method comprising an aqueous emulsion polymerization of tetrafluoroethylene, optionally in combination with one or more perfluoromonomers selected from the group consisting of perfluoroolefins having 3 to 8 carbon atoms and perfluoroalkyl(oxy)vinylethers, wherein said aqueous emulsion polymerization is carried out in an aqueous medium comprising a surfactant mixture (S), wherein mixture (S) consists of:

at least one surfactant (C6), wherein surfactant (C6) is at least one perfluorohexanoate acid or salt, in an amount of 1 to 5 g/l, with respect to said aqueous medium; and at least one surfactant (PFPE), wherein surfactant (PFPE) is at least one linear bifunctional perfluoropolyether surfactant complying with formula (I) here below:

(I)

wherein:

$X_p$, equal to or different from each other, is a hydrogen atom, a monovalent metal, or an ammonium group of formula —N(R'$_n$)$_4$, wherein R'$_n$, equal or different at each occurrence, is a hydrogen atom or a C$_1$-C$_6$ hydrocarbon group;

n' and m' are independently integers >0 such that the number average molecular weight of the surfactant (PFPE) is of 500 to 2500, said surfactant (PFPE) being used in an amount of at least 0.01 g/l and/or of at most 0.25 g/l, with respect to said aqueous medium.

2. The method of claim 1, wherein the mixture (S) comprises at least one perfluorohexanoic acid salt selected from the group consisting of sodium salt, potassium salt, ammonium salt.

3. The method of claim 1, wherein the amount of surfactant (C6) is of at least 1.5 g/l, and/or of at most 5 g/l, with respect to the aqueous medium.

4. The method of claim 1, wherein the aqueous emulsion polymerization is carried out at a temperature between 10 to 150° C. and/or at a pressure of between 2 and 50 bar.

5. The method of claim 1, wherein the amount of solids in the fluoropolymer dispersion directly resulting from the polymerization is between 3% by weight and about 40% by weight.

6. The method of claim 1, wherein the particle size (volume average diameter) of the fluoropolymer is between 40 nm and 400 nm.

7. The method of claim 1, wherein $X_p$, equal to or differnt from each other, is a hydrogen atom, an alkaline metal, a monovalent metal, or an ammonium group of formula —N(R'$_n$)$_4$, wherein R'$_n$, equal or different at each occurrence, is a hydrogen atom or an alkyl group.

8. The method of claim 2, wherein mixture (S) comprises the ammonium salt of perfluorohexanoic acid.

9. The method of claim 3, wherein the amount of surfactant (C6) is of at least 2 g/l and/or of at most 4.8 g/l, with respect to the aqueous medium.

10. The method of claim 3, wherein the amount of surfactant (C6) is of at least 2.5 g/l and/or of at most 4.5 g/l, with respect to the aqueous medium.

11. The method of claim 1, wherein the amount of surfactant (PFPE) is of at least 0.02 g/l and/or of at most 0.1 g/l, with respect to the aqueous medium.

12. The method of claim 4, wherein the aqueous emulsion polymerization is carried out at a temperature of between 20° C. and 130° C. and/or at a pressure of between 5 and 35 bar.

* * * * *